(12) United States Patent
Delos Ayllon (10) Patent No.: US 10,531,529 B2
(45) Date of Patent: Jan. 7, 2020

(54) DRIVER AND METHOD FOR DRIVING AT LEAST TWO SETS OF SOLID STATE LIGHTING ELEMENTS

(71) Applicant: SIGNIFY HOLDING B.V., Eindhoven (NL)

(72) Inventor: Julia Delos Ayllon, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/068,566

(22) PCT Filed: Jan. 10, 2017

(86) PCT No.: PCT/EP2017/050405
§ 371 (c)(1),
(2) Date: Jul. 6, 2018

(87) PCT Pub. No.: WO2017/125284
PCT Pub. Date: Jul. 27, 2017

(65) Prior Publication Data
US 2019/0082505 A1   Mar. 14, 2019

(30) Foreign Application Priority Data

Jan. 21, 2016   (EP) ..................................... 16152223

(51) Int. Cl.
*H02M 3/07*        (2006.01)
*H05B 33/08*       (2006.01)

(52) U.S. Cl.
CPC ............ *H05B 33/083* (2013.01); *H02M 3/07* (2013.01); *H05B 33/0815* (2013.01); *H05B 33/0857* (2013.01)

(58) Field of Classification Search
CPC ... H02M 3/07; H05B 33/083; H05B 33/0815; H05B 33/0857
See application file for complete search history.

(56) References Cited

U.S. PATENT DOCUMENTS 7,919,936 B2 * 4/2011 Liu ..................... H05B 33/0827
                                                    315/185 R
8,766,550 B1 * 7/2014 Yoon .................... H05B 33/083
                                                    315/200 R
(Continued)

FOREIGN PATENT DOCUMENTS

| WO | 2013086445 A1 | 6/2013 |
| WO | 2014103666 A1 | 7/2014 |
| WO | 2015040575 A1 | 3/2015 |

OTHER PUBLICATIONS

P. Kumar and W. Proefrock, "Novel switched capacitor based triple output fixed ratio converter (tofrc)," in Applied Power Electronics Conference and Exposition (APEC), 2012 Twenty-Seventh Annual IEEE, 2012, pp. 2352-2356.

*Primary Examiner* — Alexander H Taningco
*Assistant Examiner* — Kurtis R Bahr
(74) *Attorney, Agent, or Firm* — Daniel J. Piotrowski (57) ABSTRACT

A driver is provided for driving at least two sets of solid state lighting elements. A switched capacitor power converter is provided, and a switch arrangement is used for selectively connecting a first set and a second set of solid state lighting elements in series connection at the output of the power converter or connecting the first set of solid state lighting elements at the output of the power converter without the second set of solid state lighting elements. A first duty cycle of the switched capacitor power converter and a second duty cycle control of the switch arrangement are both controlled. In this driver design, a switched capacitor power converter and a switch arrangement are independently controlled using a duty cycle approach. The switched capacitor power converter is used to provide current control, and the switch arrangement is used to control whether the second set of lighting elements is connected to the output or not.

12 Claims, 3 Drawing Sheets

(56) References Cited

U.S. PATENT DOCUMENTS

| | | | |
|---|---|---|---|
| 8,773,087 B2 * | 7/2014 | Otte | H02M 3/155 |
| | | | 307/29 |
| 2006/0238465 A1 | 10/2006 | Kurumisawa | |
| 2010/0026264 A1 | 2/2010 | Ben-Yaakov et al. | |
| 2011/0068701 A1 * | 3/2011 | van de Ven | H05B 33/083 |
| | | | 315/185 R |
| 2012/0229032 A1 * | 9/2012 | Van De Ven | H05B 33/086 |
| | | | 315/151 |
| 2014/0239719 A1 * | 8/2014 | Kumar | H02M 3/07 |
| | | | 307/31 |
| 2015/0002115 A1 * | 1/2015 | Shenoy | H02M 3/158 |
| | | | 323/271 |
| 2016/0029451 A1 * | 1/2016 | Schijffelen | H05B 33/0809 |
| | | | 315/193 |
| 2017/0005576 A1 * | 1/2017 | Petersen | H02M 3/158 |

\* cited by examiner

DRIVER AND METHOD FOR DRIVING AT LEAST TWO SETS OF SOLID STATE LIGHTING ELEMENTS

CROSS-REFERENCE TO PRIOR APPLICATIONS

This application is the U.S. National Phase application under 35 U.S.C. § 371 of International Application No. PCT/EP2017/050405, filed on Jan. 10, 2017 which claims the benefit of European Patent Application No. 16152223.0, filed on Jan. 21, 2016. These applications are hereby incorporated by reference herein.

FIELD OF THE INVENTION

This invention relates to a driver and a driving method for driving at least two sets of solid state lighting elements.

BACKGROUND OF THE INVENTION

It is well known to combine different color light sources to enable a variable color output. By independently controlling three primary color light sources, a range of output colors may be generated. Typically, each light source is provided with a separate driver. Such kind of individual driving is for example disclosed in WO2014/103666.

There are also lighting systems in which two different color light sources are combined. While this does not enable full color control of the output color, it does enable various lighting effects to be obtained. For example, by combining white and red LED strings, color temperature dimming is possible, by which the color temperature is varied as a function of the dimming level.

In order to reduce cost, it would be desirable to use a single power conversion stage in systems with such color temperature dimming such as light emitting diode (LED) based luminaires.

There have been proposals for cost-effective power converters, using hybrid converters which combine switched capacitor converters (SCC) and switched inductive converters. These types of converter provide efficient high switching frequency operation, reduced size and reduced complexity. The current mode control makes them especially suitable for LED based lighting applications.

For example, WO 2015/040575 discloses the use of this type of hybrid switched capacitor converter design to drive two different LEDs in order to achieve blackbody dimming, in which the color point varies as a function of the dimming level. In WO 2015/040575, the two LEDs are in a separate parallel configuration, and the converter delivers two independent output voltages, each associated with a separate output filter. There is therefore still duplication of some components. Further, an extra controllable voltage regulator is also used to adjust the voltage to the switched capacitor converter.

SUMMARY OF THE INVENTION

When a discrete solution is required, it is particularly important to avoid the added complexity and cost of having two separate drivers, which may also then require modification to provide the additional intelligence in order to enable the desired combined functionality to be implemented. Instead, it is desirable to integrate the dual driver solution as part of a single integrated circuit, so that there is a minor impact in terms of the circuit overhead costs for adding the desired additional functionality. Reducing the component count to a single active package decreases the printed circuit board complexity, footprint and cost.

A basic idea of the invention is the series connection of the two solid state lighting elements (such as LED segments) at the same output of a switched capacitor power converter so that the switched capacitor power converter can power both lighting elements. Further, an extra switch can be coupled to one of the two lighting elements for additional control. In this way, the two lighting elements can be controlled respectively.

The invention is defined by the claims.

According to examples in accordance with an aspect of the invention, there is provided a driver for driving at least two sets of solid state lighting elements, comprising:
  a switched capacitor power converter comprising a bank of capacitors and a switch array, an output being defined from the switch array;
  a switch arrangement for selectively:
    connecting a first set and a second set of solid state lighting elements in series connection at the output; or
    connecting the first set of solid state lighting elements at the output without the second set of solid state lighting elements; and
  a controller for providing first duty cycle control of the switched capacitor power converter and second duty cycle control of the switch arrangement.

In this driver design, a switched capacitor power converter and a switch arrangement are independently controlled using a duty cycle approach. The switched capacitor power converter is used to provide overall current control, and the switch arrangement is used to control the average current of the second set by controlling whether the second set of lighting elements is connected to the output or not. The invention thus provides a driver with a single output, for example use a single output inductor to power two or more solid state lighting elements. The driver is suitable for monolithic integration.

The output may comprise a first, second and third output terminal, each at a respective node of the switch array, wherein the switch arrangement is for selectively:
  coupling the third output terminal to the second set of solid state lighting elements thereby coupling the first set of solid state lighting elements and the second set of solid state lighting elements in series at the output; or
  coupling the second output terminal to a connection point between the series connection of the first set of solid state lighting elements and the second set of solid state lighting elements thereby coupling the first set of solid state lighting elements at the output without the second set of solid state lighting elements.

In this way, a first two-terminal output is defined between the first and second output terminals, for the first set of lighting elements, and a second two-terminal output is defined between the second and third output terminals for the second set of lighting elements. When the duty cycle control of the switch arrangement turns off the second set of lighting elements, they are not shorted out, but instead a lower driver voltage is applied only to the first set of lighting elements. This means the voltage range of the switched capacitor power converter does not need to be increased/the conversion ratio of the switched capacitor power converter is maintained, and voltage stress on the switches of the switched capacitor converter is also reduced.

An inductor is preferably provided between the first output terminal and a first load terminal of the driver. This provides a hybrid converter design using both inductive and switched capacitor conversion. This inductor can be used for smoothing the output current during the switching of the switched capacitor power converter. The inductor is preferably shared between both of the two-terminal outputs. This is made possible because the two sets of solid state lighting elements are in series when both are being driven.

The controller may comprise:

a light intensity input adapted to receive a desired light intensity; and a light color input adapted to receive a desired light color, and wherein the controller is adapted to determine a first average current though the first set of solid state lighting elements and a second average current through the second set of solid state lighting elements according to the received desired light intensity and desired light color.

In this way, the two average currents are determined so that the desired average currents are caused to flow through the two sets of solid state lighting elements to emit the desired output.

The controller may be configured to control the first duty cycle in dependence on the first average current.

In this way, the first duty cycle is used to set the overall current level which is to be fully driven through the first set, and partially driven through the second sets, of solid state lighting elements.

The controller is further adapted to control the second duty cycle in dependence on the second average current and the first average current.

In this way, the second duty cycle is used to set the color by setting the fraction of the time that the second set of lighting elements is in use.

The driver may comprise:

a first current sensor for sensing the current flowing to the first set of solid state lighting elements and reporting to the controller; and a second current sensor for sensing the current flowing to the second set of solid state lighting elements and reporting to the controller.

In this way, feedback control is used for regulating the two currents, which in turn together define the desired overall intensity and color.

A first current control circuit may be provided for adjusting the first duty cycle for controlling the current flowing to the first set of solid state lighting elements and a second current control circuit may be provided for adjusting the second duty cycle for controlling the average current flowing to the second set of solid state lighting elements.

The control circuit thus implements independent current feedback control, and the settings provided to the two circuits provide the required intensity and color settings.

The bank of capacitors and the switch array may comprise a series connection of switches with a respective capacitor connected across each adjacent pair of switches, wherein alternate switches are switched in complementary manner.

The switch array thus comprises a first set of switches and a second set of switches switched in complementary manner with nodes between the switches and this is a typical design of switched capacitor power converter (SCC).

One of the output terminals is for example adapted to provide an output voltage having a level that is a fraction of an input voltage level of the switched capacitor power converter and which depends on a conversion ratio of the switched capacitor power converter, and the voltage at the first output terminal is higher than that at the second output terminal which is in turn higher than that at the third output terminal. This is a typical output arrangement of a switched capacitor power converter.

The forward voltage of the first set of solid state lighting elements preferably matches an output voltage range between the first output terminal and the second output terminal of the switched capacitor power converter, and the sum of the forward voltages of the first set of solid state lighting elements and the second set of solid state lighting elements preferably matches an output voltage range between the first output terminal and the third output terminal of the switched capacitor power converter. The third output terminal is for example a reference or ground potential.

In this way, the output voltage of the driver is always matched to the load being driven. This means the voltage range of the switched capacitor power converter does not need to be increased, the conversion ratio of the switched capacitor power converter is maintained, and voltage stress on the switches of the switched capacitor converter is also reduced.

The invention also provides a lighting system comprising a first and a second LED string and a driver as defined above, wherein the first and the second LED strings are connected in series, wherein the anode of the first LED string is connected to a first load terminal and the cathode of the second LED string is connected to a third load terminal.

The first LED string may have a white output and the second LED string may have a red output.

This enables the driver to provide blackbody dimming in which the color point varies as a function of the dimming level.

Examples in accordance with another aspect of the invention provide a method for driving at least two sets of solid state lighting elements, comprising:

using a switched capacitor power converter to generate first, second and third outputs which are used to form first, second and third driver outputs;

using a switch arrangement to selectively:

connect a first set and a second set of solid state lighting elements in series connection at the output; or connect the first set of solid state lighting elements at the output without the second set of solid state lighting elements; and providing first duty cycle control of the switched capacitor converter and second duty cycle control of the switch arrangement.

The method may comprise:

determining a first average current though the first set of solid state lighting elements and a second average current through the second set of solid state lighting elements according to the received desired light intensity and desired light color;

controlling the first duty cycle in dependence on the first average current; and controlling the second duty cycle in dependence on the second average current and the first average current.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a driver for driving at least two sets of solid state lighting elements. A switched capacitor power converter is provided, and a switch arrangement is used for selectively connecting a first set and a second set of solid state lighting elements in series connection at the output of the power converter or connecting the first set of solid state lighting elements at the output of the power converter without the second set of solid state lighting elements. A first duty cycle of the switched capacitor power converter and a second duty cycle control of the switch arrangement are both controlled.

In this driver design, a switched capacitor power converter and a switch arrangement are independently controlled using a duty cycle approach. The switched capacitor power converter is used to provide current control to both the first set and the second set of solid state lighting elements, and the switch arrangement is used to control whether the second set of lighting elements is connected to the output or not so as to tune the output of the second set.

Figure 1:
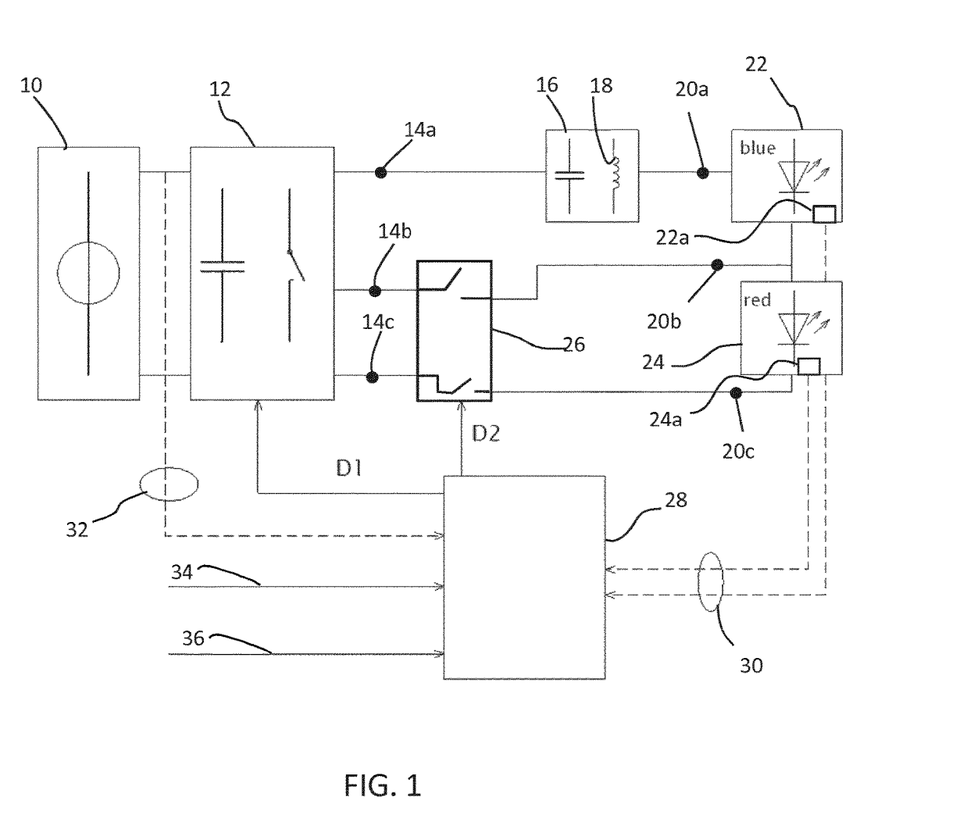
FIG. 1 shows a driver for driving a load in the form of at least two sets of solid state lighting elements.

FIG. 1 shows a driver, comprising a voltage supply 10 which provides a supply voltage to a switched capacitor power converter 12. The power converter 12 has three output terminals 14a, 14b, 14c. The first output terminal 14a is connected to an output filter 16 which comprises at least an inductor 18, and the output of the output filter 16 defines a first load terminal 20a.

The driver is for driving a load in the form of at least two sets of solid state lighting elements. A first set 22 of solid state lighting elements comprises a string of LEDs with a white output, for example based on blue LEDs with a phosphor conversion layer to convert the blue light to white light. A second set 24 of solid state lighting elements comprises a string of LEDs with a red output. It should be understood that these colors are just examples and do not limit the selection of the first and second set of solid state lighting elements.

A switch arrangement 26 is provided at the second and third output terminals 14b, 14c of the power converter and controls connection between the output terminals and the second and third load terminals 20b, 20c.

The first set 22 of LEDs is connected between the first and second load terminals 20a, 20b, and the second set 24 of LEDs is connected between the second and third load terminals 20b, 20c. Thus, the two sets 22, 24 of LEDs are connected in series between the first and third load terminals 20a, 20c with the second load terminal 20b at the series junction between them.

The switch arrangement 26 is for providing two circuit configurations.

In a first circuit configuration, the third output terminal 14c is coupled to the cathode of second set of solid state lighting elements 24 thereby coupling the first set of solid state lighting elements 22 and the second set of solid state lighting elements 24 in series at the output. In this case, the second load terminal 20b is floating.

In a second circuit configuration, the second output terminal 14b is connected to the second load terminal 20b thereby coupling the first set 22 of solid state lighting elements at the output without the second set 24 of solid state lighting elements. In this case, the third load terminal 20c is floating.

In this way, a first two-terminal output is defined between the first and second output terminals 14b, 14c for the first set 22 of solid state lighting elements, and a second two-terminal output is defined between the second and third output terminals 14b, 14c for the second set 24 of solid state lighting elements.

A controller 28 provides first duty cycle control (shown by duty cycle control signal D1) of the switched capacitor power converter 12 and second duty cycle control (shown by duty cycle control signal D2) of the switch arrangement 26.

The switched capacitor power converter 12 and the switch arrangement 26 are independently controlled using a duty cycle approach. The switched capacitor power converter 12 is used to provide overall current control, and the switch arrangement 26 is used to control whether the second set of lighting elements is connected to the output or not so as to tune the output ratio between the first set and the second set.

In the second circuit configuration, the LEDs of the second set 24 are not shorted out, but instead a lower driver voltage (between output terminals 14a and 14b) is applied only to the first set 22 of lighting elements. This means the voltage range of the switched capacitor power converter does not need to be increased.

The driver has a dual output, but uses a single output inductor 18, and has reduced voltage stress on the switches of the switched capacitor power converter 12. The driver is suitable for monolithic integration.

A first current sensor 22a is provided for sensing the current flowing to the first set 22 of LEDs and reporting to the controller 28 and a second current sensor 24a is provided for sensing the current flowing to the second set 24 of LEDs and reporting to the controller 28. The sensed current can be used for controlling the respective duty cycles.

In this way, feedback control is used for regulating the two currents, represented by the feedback path 30, which in turn together define the desired overall intensity and color. There is also voltage sensing at the voltage supply 10 as shown by the feedforward signal path 32.

The controller 28 thus implements feed-back and feed-forward closed loop control.

Two control inputs are provided to the controller 28. A first 34 comprises a light intensity set point and a second 36 comprises a color temperature set point.

In this driver, the output current provided by the power converter 12 may be controlled by three measures: pulse width modulation (PWM), frequency modulation (FM) and/or on-channel resistance modulation. The output current through the second set 24 of LEDs can be independently controlled using the switch arrangement 26 by means of pulse width modulation, thus enabling color temperature dimming.

Figure 2:
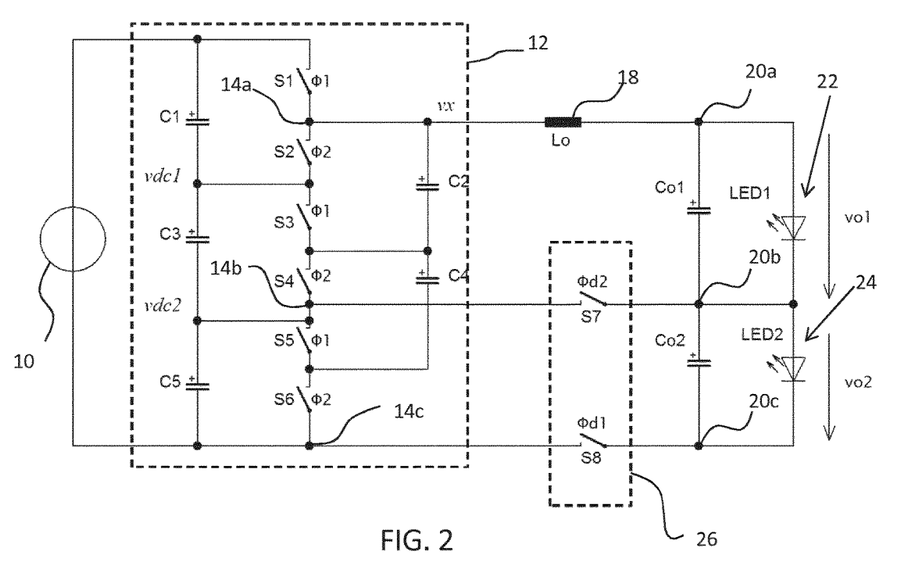
FIG. 2 shows one example of suitable circuit arrangement in more detail.

FIG. 2 shows one example of suitable circuit arrangement in more detail. For the sake of clarity, the controller block 28 and the sensors are not included.

The switched capacitor power converter 12 comprises a bank of capacitors C1 to C5 and a switch array S1 to S6, with the three output terminals 14a, 14b, 14c defined at nodes of the switch array.

The bank of capacitors and the switch array comprise a series connection of the switches S1 to S6 with a respective capacitor connected across each adjacent pair of switches.

In the example shown, there are six switches and five capacitors. Capacitor C1 is connected in parallel with the series connection of switches S1 and S2. Capacitor C2 is connected in parallel with the series connection of switches S2 and S3. Capacitor C3 is connected in parallel with the series connection of switches S3 and S4. Capacitor C4 is connected in parallel with the series connection of switches S4 and S5. Capacitor C5 is connected in parallel with the series connection of switches S5 and S6.

The capacitors C1, C3 and C5 define a voltage divider, which sets two dc voltage levels, vdc1 and vdc2. At least one of the output terminals (in particular the first output 14a and the second output terminal 14b) provides a voltage having a level that is a fraction of the input voltage Vin and which relates to the conversion ratio of the switched capacitor power converter 12, and in dependence on the duty cycle of the switches S1 to S6. The voltage at the first output terminal 14a is higher than that at the second output terminal 14b which is in turn higher than that at the third output terminal 14c.

The node between switches S1 and S2 defines the first output terminal 14a. The node between switches S4 and S5 defines the second output terminal 14b. The node at the bottom (low voltage) end of the switch array defines the third output terminal 14c. This is for example a ground connection.

The forward voltage of the first set 22 of solid state lighting elements matches an output voltage range between the first output terminal 14a and the second output terminal 14b of the switched capacitor power converter, and the sum of the forward voltages of the first and second sets 22, 24 of solid state lighting elements matches an output voltage range between the first output terminal and the third output terminal of the switched capacitor power converter. In this way, the output voltage of the driver is always matched to the load being driven.

This configuration is a known switched capacitor configuration. Alternate switches are switched in complementary manner. Thus, there are only two switch control signals, φ1 and φ2. These together form the first duty cycle control D1.

Thus:

$$\varphi 1 = (\varphi 2)^-$$

In the switched capacitor power converter, for a typical example in which the capacitors C1, C3 and C5 have the same capacitance, the voltage range at the first output 14a (with respect to ground) is from the full input voltage to ⅔ of the input voltage, depending on the duty cycle of φ1 ranging from 100% to 0%. The voltage at the second output 14b is ⅓ of the input voltage.

A first output capacitor Co1 is across the first set 22 of LEDs and a second output capacitor Co2 is across the second set 24 of LEDs. This circuit forms a 3:1 ladder circuit with a voltage vo1 defined across the first set 22 of LEDs and a voltage vo2 across the second set 24 of LEDs.

The frequency and the duty cycle of the two signals which define the first duty cycle control D1 are adjusted by the closed loop control in order to set the current level through the inductor 18 and LED strings according to the light intensity set point 34 and color temperature set point 36 which will be discussed later in detail.

The switch arrangement 26 comprises a first switch S7 between the second output terminal 14b and the second load terminal 20b switched with a signal φd2 from the controller, and a second switch S8 between the third output terminal 14c and the third load terminal 20c switched with a signal φd1 from the controller. These together form the second duty cycle control D2.

Thus:

$$\varphi d1 = (\varphi d2)^-$$

When φd1 is active S7 is open and S8 closed. This defines the first configuration in which current flows through both LED strings 22, 24, thus emitting red and white light. Under this condition, the duty cycle D1 is:

$$D\_(1,\varphi d1) = (3[(v\_o1+v)]\_o2))/vin - 2.$$

For a duty cycle of D1=1 there is no conversion and (vo1+vo2)=vin. When D1=0, (vo1+vo2)=0.666vin. The output voltage can be regulated between these values.

When φd2 is active S7 is closed and S8 is open, current flows only through the first (blue) LED string 22 (with mainly white output). Under this condition the duty cycle D1 is:

$$D\_(1,\varphi d2) = (3v\_o1)/vin - 1.$$

For a duty cycle of D1=1 there is no conversion and vo1=0.666(vin) because two third of the input voltage is dropped across the capacitors C1 and C2. When D1=0, vo1=0.333vin, i.e. the voltage across only capacitor C3. The output voltage can be regulated between these values.

The above formula between the duty cycle and voltage is just for showing the inherent relationship therebetween within the switched capacitor power converter. In real-time regulation, the duty cycle D1 is controlled based on current feedback rather than voltage control. To adjust the duty cycles, the average current through the inductor 18 is sensed. There are different ways to implement this control, for example using a resistor in series with the LED load. The sensing may instead be implemented by measuring the drain-source voltage of one of the transistors used to implement the switches S1 or S2.

In this way, the current through the second LED string 24 is dimmed by high frequency pulse width modulation. The duty cycle D2 is adjusted by the closed loop control in order to set the light output according to the light intensity set point 34 and the color temperature set point 36 which will be discussed later in detail.

The second duty cycle control D2 enables the current through the second set 24 of LEDs to be controlled.

The relation between the average current of the first set 22 of LEDs (i_LED1) and the second set 24 of LEDs (i_LED2) is given by:

$$i\_LED2 = D2 * i\_LED1$$

This equation relates the average current in the inductor or first set 22 of LEDs with the average current in the second set 24 of LEDs.

Note that there is a greater load at the output when both sets of solid state lighting elements are in circuit. Thus, the current feedback control to set the duty cycle D1 will adapt to the load in order to set the output current. The duty cycle control for D1 is thus at a much faster rate than for D2. The duty cycle control D1 operates up to the switching frequency of the switched capacitor converter, whereas the duty cycle control D2 is slower for example for the adaptive dimming control.

The duty cycle control of the first cycle control D1 for example operates at tens or hundreds of kHz. while duty cycle of D2 operates at lower frequency, for example kHz or hundreds of Hz to mitigate flicker.

The wiring of the switches S7 and S8 forming the switch arrangement 26 prevents the first set 22 of LEDs falling out of the reduced dynamic range of the power converter 12. When φd1 is low (i.e. (φd1))—the second set 24 of LEDs is not supplied with power, therefore the power converter has to supply only the voltage vo1, which would fall out of the voltage range of the converter between the first output 14a and the third output 14c if the second set 24 of LEDs would be short-circuited to ground. Instead, the cathode of the first set 22 of LEDs is connected to the second output terminal 14b, which changes the power converter configuration to provide the appropriate conversion range for only supplying the first set 22 of LEDs.

Figure 3:
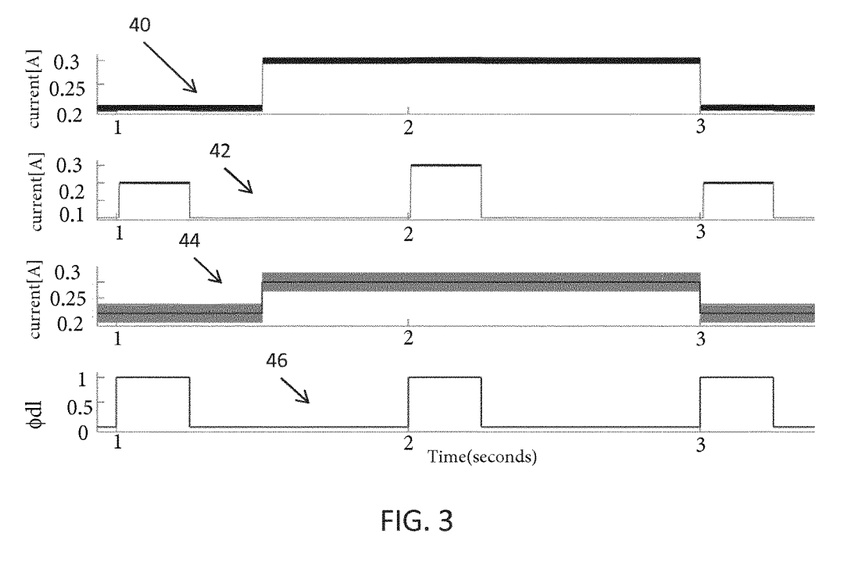
FIG. 3 shows current and duty cycle plots to explain the circuit operation.

FIG. 3 shows current and duty cycle (of D2) plots to explain the circuit operation. The plots are based on an output LED string composed of a single blue LED with a forward voltage of 3V as the first set and a single red LED with a forward voltage of 2.75V as the second set.

Plot 40 shows the current through the blue LED. Plot 42 shows the current through the red LED. Plot 44 shows the reference current provided to the power converter (as the central solid line) and inductor current, which varies with a frequency higher than can be seen in the figure, hence the solid looking band above and below the central solid line. Plot 46 shows the duty cycle signal ϕd1 for controlling the switch S8, and which defines the duty cycle signal D2.

In FIG. 3, at first the output current level of the switched capacitor power converter is 0.2 A, and there is then an adjustment in current level from 0.2 A to 0.3 A. The current is later adjusted back to 0.2 A. It can be seen that the current is the same when the red LED is on and off so that that the peak current in both LEDs is the same. However, the overall intensity and the color point may be controlled independently. For example, the red LED is shown to be operated for a shorter period of time. This means that the increased brightness is accompanied by a drop in the relative amount of red content.

From FIG. 3, it can be seen that the current through the blue LED, which is equal to the inductor current, follows the light intensity set point and color temperature set point, as represented by the solid line in plot 44. The red LED has a square-wave current, wherein the peak value is equal to the inductor current. The conduction time of the red LED is controlled by the signal ϕd1. The circuit provides control of the current through the two LEDs (and therefore through two LED strings in a full implementation) with a single power train, which can be employed for blackbody dimming of LED lamps.

Figure 4:
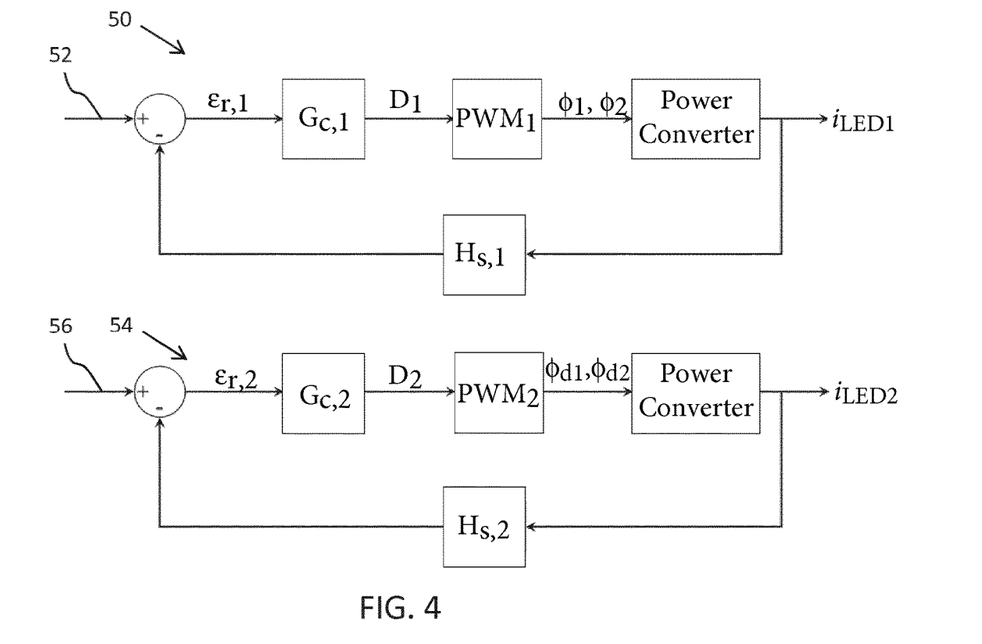
FIG. 4 shows two separate feedback systems for controlling the converter.

The control of the converter can be implemented with two separate feedback systems as shown in FIG. 4.

The top part of FIG. 4 shows a current control circuit 50 which receives a current set point 52 for the first set 22 of LEDs. The bottom part of FIG. 4 shows a current control circuit 54 which receives a current set point 56 for the second set 24 of LEDs. There are two independent closed loop control circuits, that enable the current of each LED string to be set. Both of them operate in conventional manner with negative feedback and result in the selection of the timing signals for the two duty cycle controls. The LED currents are sensed, by direct or indirect means, and compared with the reference set-points. The resulting error signals ($\epsilon_{(r,x)}$) are processed by close loop controllers (Gc,x) providing the duty cycle signals D1 and D2 for the power converters. The pulse with modulators (PWMx) convert the duty cycle signals D1 and D2 to the switch activation signals ($\phi\_1, \phi\_2, \phi\_d1$ and $\phi\_d2$).

The correct combination of light intensity and color point is implemented by adjusting both current set points 52, 56. The light intensity is controlled by adjusting the average current in the inductor (but taking into account the amount of time that current will flow to one and then both sets of LEDs), and the color temperature is controlled by adjusting the proportion of red light with respect to white light, thus adjusting the current in the second set of LEDs.

For example, if the brightness requires an equivalent of 200 mA average current through one set of LEDs, and the color point requires a 4:1 ratio between white (the first set) and red (the second set), the settings can be set as an average current of 160 mA for the first set and 40 mA for the second set. The 160 mA current is constantly output at the first load terminal and to the first set of LEDs, and it is the set point of the circuit 50. A duty cycle of ¼ is applied to D2, so that ¼*160 mA=40 mA. Only one quarter of the time is the second set of lighting elements in the loop, but also at 160 mA. Thus a combination of the constant 160 mA white light output and the ¼ duty cycled 160 mA red light would provide the 200 mA average current and 4:1 color point.

The duty cycle D1 is different for the time periods when the second set of LEDs is on and off, since a different power is drawn from the power converter.

Figure 5:
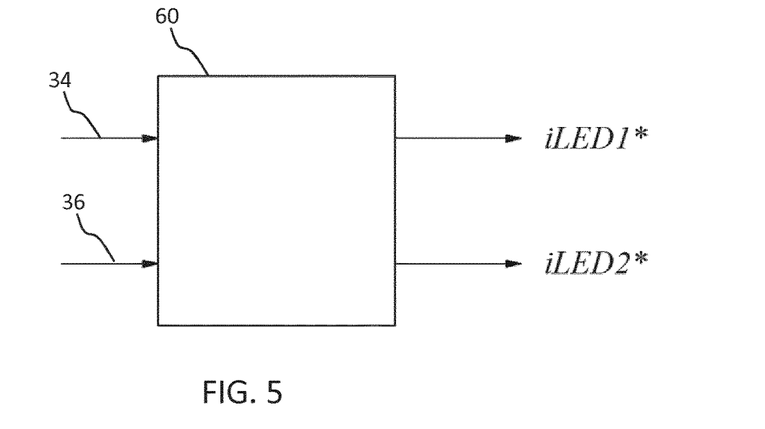
FIG. 5 shows a light controller for selecting set points for the feedback systems of FIG. 4.

To select the correct two set points, a light controller 60 as shown in FIG. 5 comprises an algorithm (based on algebraic expressions or based on look-up tables) that enable the desired visual settings (light intensity and color temperature) to be converted to the required the right current levels. These current levels are then used as the set points for the current control system. The algorithm to convert from the light settings to the LED current levels is based on the LED characteristics, in known manner.

In this way, the controller determines a first average current though the first set of solid state lighting elements (which corresponds to the average inductor current, since this current always flows through the first set of solid state lighting elements) and a second average current through the second set of solid state lighting elements according to the received desired light intensity and desired light color.

The driver thus implements a control method by which first duty cycle control is provided of a switched capacitor converter and second duty cycle control is provided of the switch arrangement. A first average current though the first set of solid state lighting elements and a second average current through the second set of solid state lighting elements are determined as explained above, according to the received desired light intensity and desired light color. The first duty cycle is controlled in dependence on the first average current (since this always flows through the first set of lighting elements) and the second duty cycle is controlled in dependence on the second average current and the first average current.

The invention provides a multi-mode power converter, in particular for use as an LED driver. The driver may be integrated as part of a system on chip or system in package. It may in particular be used for blackbody color temperature dimming.

The example above is based on a hybrid converter using a switched capacitor arrangement and an inductor filter for current smoothing. The inductor is not essential, and the invention may be applied to only a switched capacitor converter.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a

The invention claimed is:

1. A driver for driving at least two sets of solid state lighting elements, comprising:
a switched capacitor power converter comprising a bank of capacitors and a switch array, an output being defined from the switch array;
a switch arrangement for selectively:
connecting a first set and a second set of solid state lighting elements in series connection at the output; or
connecting the first set of solid state lighting elements at the output without the second set of solid state lighting elements; and
a controller for providing first duty cycle control of the switched capacitor power converter and second duty cycle control of the switch arrangement, the controller including a light intensity input adapted to receive a desired light intensity and a light color input adapted to receive a desired light color;
wherein the controller determines a first average current though the first set of solid state lighting elements and a second average current through the second set of solid state lighting elements according to the received desired light intensity and desired light color, and controls the first duty cycle in dependence on the first average current, and controls the second duty cycle in dependence on the second average current and the first average current.

2. The driver according to claim 1, wherein the output comprises a first, second and third output terminal, each at a respective node of the switch array, wherein the switch arrangement is for selectively:
coupling the third output terminal to the second set of solid state lighting elements thereby coupling the first set of solid state lighting elements and the second set of solid state lighting elements in series at the output; or
coupling the second output terminal to a connection point between the series connection of the first set of solid state lighting elements and the second set of solid state lighting elements thereby coupling the first set of solid state lighting elements at the output without the second set of solid state lighting elements.

3. The driver as claimed in claim 2, comprising an inductor between the first output terminal and a first load terminal of the driver.

4. The driver as claimed in claim 1, comprising:
a first current sensor for sensing the current flowing to the first set of solid state lighting elements and reporting to the controller; and
a second current sensor for sensing the current flowing to the second set of solid state lighting elements and reporting to the controller.

5. The driver as claimed in claim 4, comprising a first current control circuit for adjusting the first duty cycle for controlling the current flowing to the first set of solid state lighting elements and a second current control circuit for adjusting the second duty cycle for controlling the average current flowing to the second set of solid state lighting elements.

6. The driver as claimed in claim 1, wherein the bank of capacitors and the switch array comprises a series connection of switches with a respective capacitor connected across each adjacent pair of switches, wherein alternate switches are switched in complementary manner.

7. The driver as claimed in claim 6, wherein one of the output terminals is adapted to provide an output voltage having a level that is a fraction of an input voltage level of the switched capacitor power converter and which depends on a conversion ratio of the switched capacitor power converter, and the voltage at the first output terminal is higher than that at the second output terminal which is in turn higher than that at the third output terminal.

8. The driver as claimed in claim 7, wherein:
the forward voltage of the first set of solid state lighting elements matches an output voltage range between the first output terminal and the second output terminal of the switched capacitor power converter;
the sum of the forward voltages of the first set of solid state lighting elements and the second set of solid state lighting elements matches an output voltage range between the first output terminal and the third output terminal of the switched capacitor power converter; and
the third output terminal is a reference or ground potential.

9. The lighting system comprising a first and a second LED string and a driver as claimed in claim 1, wherein the first and the second LED strings are connected in series, wherein the anode of the first LED string is connected to a first load terminal and the cathode of the second LED string is connected to a third load terminal.

10. The lighting system as claimed in claim 9, wherein the first LED string has a white output and the second LED string has a red output.

11. A method for driving at least two sets of solid state lighting elements, comprising:
using a switched capacitor power converter to generate first, second and third outputs which are used to form first, second and third driver outputs;
using a switch arrangement to selectively:
connect a first set and a second set of solid state lighting elements in series connection at the output; or
connect the first set of solid state lighting elements at the output without the second set of solid state lighting elements; and
providing first duty cycle control of the switched capacitor converter and second duty cycle control of the switch arrangement;
determining a first average current though the first set of solid state lighting elements and a second average current through the second set of solid state lighting elements according to a received desired light intensity and desired light color;
controlling the first duty cycle in dependence on the first average current; and
controlling the second duty cycle in dependence on the second average current and the first average current.

12. The method as claimed in claim 11, comprising controlling a first LED string with a white output and a second LED string with a red output.

* * * * *